May 10, 1949.   D. L. BREI   2,469,945
LOAD HANDLING ATTACHMENT FOR AUTOMOBILES
Filed Oct. 3, 1944   2 Sheets-Sheet 1
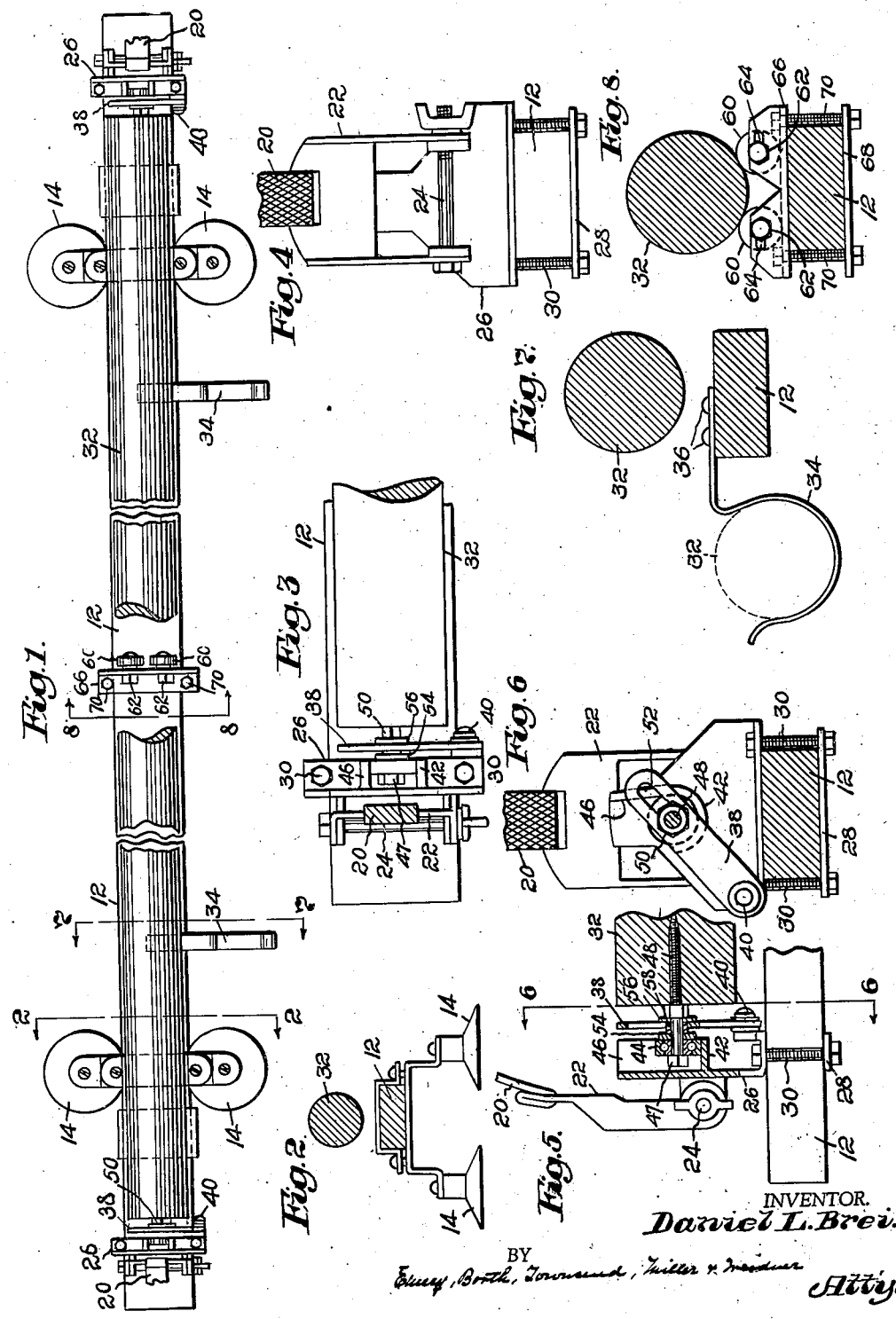
INVENTOR.
Daniel L. Brei.

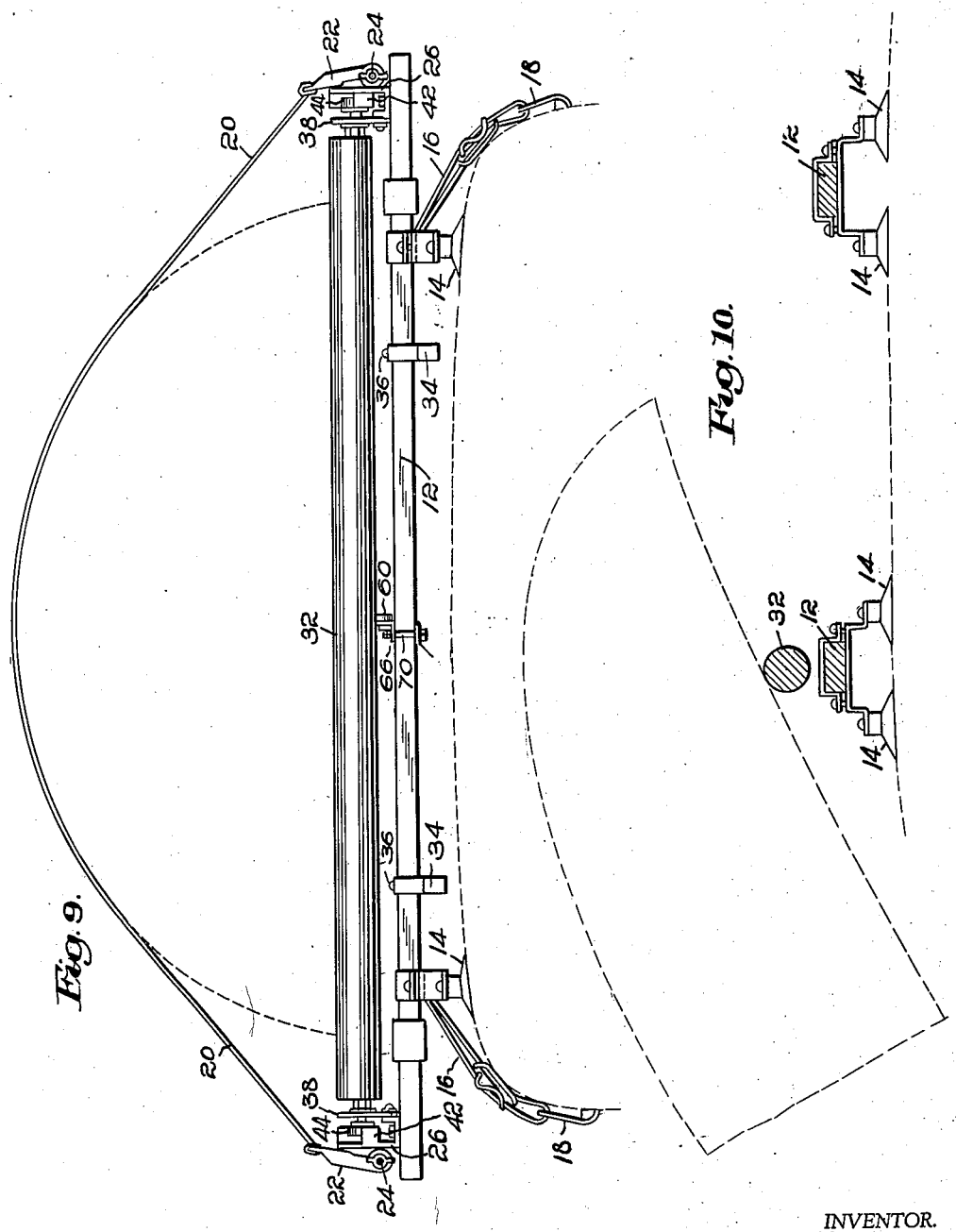

Patented May 10, 1949

2,469,945

UNITED STATES PATENT OFFICE 2,469,945

LOAD HANDLING ATTACHMENT FOR AUTOMOBILES

Daniel L. Brei, Cambridge, Mass., assignor to Wesbar Stamping Corporation, West Bend, Wis., a corporation of Wisconsin Application October 3, 1944, Serial No. 557,025

8 Claims. (Cl. 193—42)

This invention relates to a novel and improved load handling attachment for application to the roof of an automobile. Heretofore, it has been common practice to carry not only skis but even heavier loads such as canoes and row-boats on the roof of an ordinary passenger automobile by attaching the load by means of straps to two detachable carriers such as wooden bars normally held in place on the car roof by suction cups and by other straps with terminal hooks interlocked with the gutters at the sides of the car roof. However, the loading and unloading of a heavy object such as a boat has been a difficult matter. This invention aims to improve such carriers by the provision of an arrangement on the rear carrier to enable even a heavy boat to be loaded and unloaded with ease and yet without interference with the usual mode of attaching the load to the carriers.

The invention will be understood by reference to the following description when taken in connection with the accompanying drawing of one specific embodiment thereof, while its scope will be pointed out more particularly in the appended claims.

In the drawing:

Fig. 1 is a plan of a load handling attachment embodying the invention;

Fig. 2 is a sectional view on line 2—2 of Fig. 1;

Fig. 3 is a plan, on an enlarged scale and partly in horizontal section of a portion of the load handling attachment;

Fig. 4 is an end elevation of the load handling attachment;

Fig. 5 is a rear elevation partly in vertical section of a portion of the load handling attachment;

Fig. 6 is a sectional view on line 6—6 of Fig. 5;

Fig. 7 is a sectional view on line 7—7 of Fig. 1;

Fig. 8 is a sectional view on line 8—8 of Fig. 1;

Fig. 9 is a rear elevation of the load handling attachment with a boat supported thereon and a car roof, both shown in broken lines; and Fig. 10 is a side elevation illustrating the mode of loading or unloading the boat.

Referring to the drawing and to the embodiment of the invention illustrated therein as an example, there is shown a load handling attachment comprising a bar 12, customarily made of wood, and equipped with usual suction cups 14, arranged in pairs to be seated upon and to adhere to the car roof. Usual straps 16, with terminal hooks 18 to hook beneath the gutters of the car in the customary manner, attach the bars 12 to the car roof. The load, such as a canoe or row-boat, is customarily placed inverted upon the bars 12 and held in place by straps 20 passed over the upwardly disposed bottom of the boat. In accordance with the present invention, these straps are attached by links 22 (see Fig. 5) and pivotal bolts 24 to brackets 26, the latter being secured to the bar 12 as by clamping plates 28 and bolts 30.

To facilitate the handling of the load in placing the same upon and in removing the same from the load supporting bars 12, I have provided a load supporting roller 32, which is so arranged as to support the load temporarily, during handling of the load, and to assist in the emplacement of the load upon the bars 12. To these ends, I have provided means for relative movement of the load supporting roller and the load supporting bar to enable the weight of the load to be transferred from one to the other. One such arrangement will now be described, reference being had at first to Fig. 7.

Let it be assumed, for example, that it is desired to have the roller above the level of the bar during the handling of the load and to have the roller at the rear of the bar and no higher than the bar when the load is to rest upon and to be secured to the bar. In the present example, the roller in its non-operating position rests in one or more, herein two, supporting brackets 34 suitably secured to the supporting bar 12 as by screws 36. As shown, these brackets embrace the roller with resilient pressure so that the roller will not rattle up and down.

While the desired result might be achieved by a straight vertical rise of the roller to a position where it will sustain the load temporarily, I prefer to have the roller directly above the bar during the handling of the load. This preferred arrangement naturally involves, not merely an upward movement of the roller, but a horizontal (forward) movement as well. In one such arrangement, the roller is moved in a curved path. This is conveniently achieved in the present example by arms 38 (see Figs. 5 and 6) mounted on pivots 40 on the brackets 26, and arranged to swing forwardly and rearwardly in vertical planes. These arms are simply a convenient means for transferring the roller from its non-operating position at the rear of the bar to its operating position above the bar. Preferably, however, these arms are not the sole support for the roller in its operating position.

To afford the fullest possible support for the roller in its operating position, I have provided means for sustaining it upon the brackets 26. To this end, these brackets are provided with flanges 42 which constitute roller supports, on which the roller is supported and is rotatable about its axis when in position above the bar. Each flange 42 is formed as a socket (arcuate in the present example) as shown in Fig. 6 to receive a bearing 44 suitably carried by and coaxial with the roller 32, and the flange is carried upwardly beyond this socket to constitute an abutment 46 which limits rearward movement of the bearing, whereupon the bearing drops into the arcuate socket. To insure freedom of rotation the bearing 44 preferably is an ordinary commercial ball bearing with inner and outer ball races, the inner race being held in place as by a nut 47 threaded onto a spindle which in the present example is a commercially known lag-screw 48 (see Fig. 5) having an integral, polygonal shoulder 50 to enable it to be screwed axially into the roller 32, and having outwardly beyond said shoulder what amounts to a machine screw extension integral with the lag-screw. This machine screw extension serves, not only to hold the inner ball race of the bearing 44, but also passes through a slot 52 (see Fig. 6) in the adjacent roller carrying arm 38. The provision of this slot permits the bearing 44 to be lifted out of its supporting socket when the roller 32 is to be shifted to its non-operating position. In the present example, there are washers 54 and 56 (see Fig. 5) at opposite sides of the arm 38, and between these washers there is a third washer 58 which slides and turns in the slot 52 (Fig. 6).

When the roller 32 is in its load-sustaining, operating position, deflection of its central portion is conveniently prevented by supporting bearings 60 (see Fig. 8) also preferably ordinary commercial ball bearings whose inner races receive bolts 62 laterally adjustable in slots 64 in a bracket 66 suitably secured to the bar 12 as by a clamping plate 68 and bolts 70. The lateral adjustment of the bearings 60 enables them to be adjusted to the periphery of the roller 32.

The operation of the load handling attachment will now be described, reference being had more particularly to Figs. 9 and 10 which show its relationship with a car and a boat, both represented in broken lines therein. When the boat is to be placed upon the car, the roller 32 is placed in its operating position above the rear bar 12 and the boat, bottom side up, is placed angularly against the roller. The boat is then lifted and pushed forwardly with relation to the car as far as desired, and rested upon the forward supporting bar 12, upon which it is strapped as usual. The rear end of the boat is then lifted sufficiently to enable the roller 32 to be returned to its non-operating position, after which the boat is strapped to the rear supporting bar 12. Removal of the boat is accomplished by a reversal of this operation.

Having thus described one embodiment of the invention, what I claim is:

1. In a load handling apparatus for attachment to the roof of a car, the combination of a horizontally disposed, load supporting roller, spindles projecting from the ends of said roller, arms which support said spindles, and fixed brackets on which said arms are pivoted to swing about a horizontal axis from an elevated position to a lowered position and to carry said roller from an elevated, operating position to a lowered, non-operating position, said brackets having downwardly directed attaching means constructed for support above the roof of the car, said arms being provided with slots providing for movement of said roller toward and from said axis during swinging movement of said arms about said axis.

2. In a load handling apparatus for attachment to the roof of a car, the combination of a horizontally disposed, load supporting roller, spindles projecting from the ends of said roller, arms which support said spindles, and fixed brackets on which said arms are pivoted to swing about a horizontal axis from an elevated position to a lowered position and to carry said roller from an elevated, operating position to a lowered, non-operating position, said brackets having downwardly directed attaching means constructed for support above the roof of the car, said brackets presenting seats to sustain said roller in its elevated, operating position.

3. In a load handling apparatus for attachment to the roof of a car, the combination of a horizontally disposed, load supporting roller, spindles projecting from the ends of said roller, arms which support said spindles, and fixed brackets on which said arms are pivoted to swing about a horizontal axis from an elevated position to a lowered position and to carry said roller from an elevated, operating position to a lowered, non-operating position, said brackets having downwardly directed attaching means constructed for support above the roof of the car, said brackets presenting stops to limit swinging movement of said arms toward the elevated, operating position of said roller, said brackets presenting also seats to sustain said roller in its elevated, operating position.

4. In a load handling apparatus for attachment to the roof of a car, the combination of a horizontally disposed, load supporting roller, spindles projecting from the ends of said roller, arms which support said spindles, and fixed brackets on which said arms are pivoted to swing about a horizontal axis from an elevated position to a lowered position and to carry said roller from an elevated, operating position to a lowered, non-operating position, said brackets having downwardly directed attaching means constructed for support above the roof of the car, said brackets presenting stops to limit swinging movement of said arms toward the elevated operating position of said roller, said brackets presenting also seats to sustain said roller in its elevated, operating position, said arms being provided with slots providing for movement of said roller toward said seats when said arms and said roller are elevated.

5. In a load handling apparatus for attachment to the roof of a car, the combination of a horizontal, load supporting roller, spindles projecting from the ends of said roller, arms having openings which receive said spindles, fixed brackets having underlying means constructed and arranged for mounting above the roof of a car, and pivots connecting said arms to said brackets and providing fulcrums on which arms swing about a horizontal axis to carry said roller from an operating position above said brackets to a lowered non-operating position, said brackets presenting abutments which limit swinging movement of said arms toward said operating position and presenting also seats which afford support for said roller in said operating position.

6. In a load handling apparatus for attachment to the roof of a car, the combination of a horizontal, load supporting roller, spindles projecting from the ends of said roller, arms having openings which receive said spindles, fixed brackets having underlying means constructed and arranged for mounting above the roof of a car, and pivots connecting said arms to said brackets and providing fulcrums on which arms swing about a horizontal axis to carry said roller from an operating position above said brackets to a lowered non-operating position, said brackets presenting abutments which limit swinging movement of said arms toward said operating position and presenting also seats which afford support for said roller in said operating position, and means affording support for said roller in said non-operating position.

7. A carrier for use in transporting boats or other articles on the metal tops of automobiles and comprising front and rear transverse bars extending across the car top and adapted to have supporting engagement with the article carried, means supporting the bars above and securing them to the car top, brackets secured to the end portions of the rear transverse bar and extending upwardly therefrom, a roller for said brackets, for supporting said roller for rotation about its own axis and being selectively shiftable from an idle, storage position below the level of the bar to an operative loading and unloading position above the bar.

8. In an object loading and supporting structure, an elongated transverse support, spaced brackets each having a portion projecting above said support, clamping mechanism for removably connecting each bracket to the support including means depending from each bracket and spanning the width of said support, a roller, and means on said brackets for supporting said roller in a plurality of selective positions relative to said brackets, one of said positions being an idle storage position wherein the top of the roller is below the plane of the top of the transverse support, and the other of said positions being an elevated loading or unloading position.

DANIEL L. BREI.

REFERENCES CITED

The following references are of record in the file of this patent:

UNITED STATES PATENTS

| Number | Name | Date |
|---|---|---|
| 1,439,257 | Ogren | Dec. 19, 1922 |
| 1,519,416 | Ogren | Dec. 16, 1924 |
| 2,325,762 | Ford | Aug. 3, 1943 |